TRANSIENT OVERVOLTAGE AND OVERLOAD PROTECTION CIRCUIT
Filed May 7, 1963
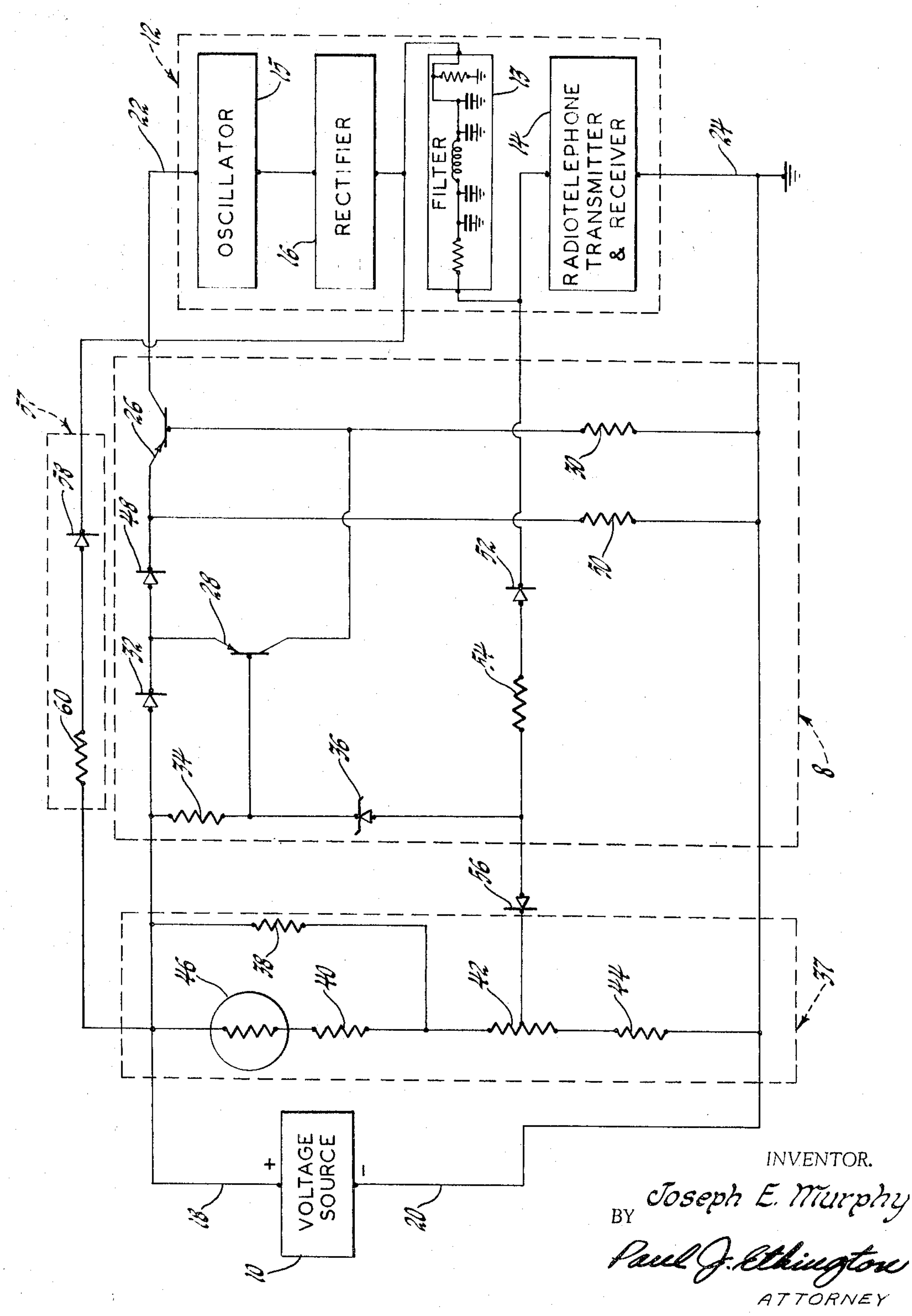
INVENTOR.
Joseph E. Murphy
BY Paul J. Ethington
ATTORNEY United States Patent Office
3,303,386
Patented Feb. 7, 1967

3,303,386
TRANSIENT OVERVOLTAGE AND OVERLOAD PROTECTION CIRCUIT

Joseph E. Murphy, Cudahy, Wis., assignor to General Motors Corporation, a corporation of Delaware Filed May 7, 1963, Ser. No. 278,573
7 Claims. (Cl. 317—31)

This invention relates to a protection circuit and more particularly to a circuit for protecting transistors and the like against both transient overvoltages and overloads or short circuits.

A transistor may easily be damaged by passing high current through it as a result of the application of high voltages across the terminals thereof or as a result of a short circuit in the load. Previous methods of protection against the harmful effects of overvoltages and short circuits have been ineffective when applied to transistor circuits. In particular, the prior art devices such as fuses and circuit breakers have a longer operating period than the thermal time constant of the transistors. Because of this time lag, the transistors may be damaged before the fuses or circuit breakers operate to open the circuit. Voltage regulators have been proposed to protect transistors from overvoltage but the regulator itself lacks reliability since the regulating transistor, during a slow transient, operates in a non-saturated region which results in high dissipation and transistor failure. Protection circuits such as disclosed in Patent 3,048,718 to Starzec et al. have proven highly successful in protecting transistor circuits from transient overvoltages but do not provide for overload or short circuit protection.

In accordance with this invention, a simple but efficient protection circuit is provided which will instantaneously interrupt the source of power to a load upon the occurrence of either excessive transient overvoltages or short circuits in the load. This is accomplished by controlling the operation of an electronic switch by means of a control device which is connected in the circuit so as to be responsive to both overvoltage and overload. The electronic switch or controlled transistor is connected in series between the voltage source and the load and is forwardly biased to a condition of current saturation or full conduction. The controlled transistor is operated by a control transistor which has its input circuit connected across a bias resistor which is connected in series with a voltage reference device such as a Zener diode. The Zener diode is reversely biased by connection through an isolating diode to a voltage dividing network which is connected across the source. The Zener diode is also connected through a resistor and a diode to the load. The control transistor is reversely biased to a condition of current cut off or non-conduction by load current flowing through a diode in its input circuit. The output circuit of the control transistor is connected across the input circuit of the controlled transistor. With the Zener diode connected in this fashion, it will conduct current in response to both excessive transient overvoltages and short circuits. If either an overvoltage or a short circuit occurs, the Zener diode allows current to flow through the bias resistor causing the control transistor to become fully conductive and the controlled transistor to cut off to disconnect the load from the source. The isolating diode makes the overload circuit independent of the transient voltage setting as determined by the voltage dividing network.

A better understanding of the invention together with a fuller appreciation of its many advantages will best be gained from the following detailed description given in connection with the single figure of the drawings which shows a specific transient overvoltage and short circuit protection network embodying features of the invention.

Referring now to the drawings, a transient overvoltage and overload protection circuit 8 is interposed between a voltage source 10, such as a battery, and a load 12. The load 12 may comprise a transistorized converter, filter 13 and radiotelephone transmitting and receiving equipment 14. The converter may conveniently be a conventional D.C. to D.C. converter including a transistor oscillator 15 and a rectifier 16 for converting a low direct current potential to a higher direct current potential as disclosed in Patent 3,048,764 to Joseph E. Murphy.

The protection circuit 8 has input terminals 18 and 20 and output terminals 22 and 24 and comprises a controlled transistor 26 and a control transistor 28 connected in a common or oscillatory loop between the input and output terminals to function as a switch. In this illustrative embodiment the transistors 26 and 28 are PNP junction type power transistors, but it will be apparent that the NPN type transistor may be used with suitable reversal of polarities.

The controlled transistor 26 has an output circuit extending between the emitter and collector electrodes connected to the input terminal 18 and output terminal 22, respectively. The input circuit of the controlled transistor 26 extends between the emitter and base electrodes and includes a current limiting resistor 30 in the base circuit. In its normal condition the controlled transistor 26 is forwardly biased by the emitter to base current to hold the emitter to collector circuit, which carries the load current, in the region of current saturation.

The control transistor 28 has an input circuit extending between emitter and base electrodes including a diode 32, suitably of the semiconductor type, and a resistor 34. The resistor 34 is connected in series with a voltage reference device or Zener diode 36 which is reversely biased by connection with a voltage dividing network 37 comprising resistors 38, 40, 42, 44 and thermistor 46 connected across the input terminals. A diode 48 suitably of the semiconductor type is connected between the emitter of transistor 28 and the emitter of transistor 26 in series with a resistor 50 of high value which is connected to the input terminal 20 to form a voltage divider. The diode 48 carries the varying load current and develops a substantially constant polarized voltage drop which exceeds the voltage drop across the emitter to collector of transistor 28 to bias the transistor 26 in the reversed direction when transistor 28 is conductive. A diode 52, suitably of the semiconductor type, and a resistor 54 are connected between the anode of Zener diode 36 and the load 12. An isolating diode 56, suitably of the semiconductor type, is connected between the Zener diode 36 and the resistor 42. The purpose of the isolating diode 56 is to make the overload circuit independent of the transient voltage setting as determined by the resistor 42 as will become apparent hereinafter.

An enabling circuit 57 comprising a diode 58, suitably of the semiconductor type, and a resistor 60 are connected between the input terminal 18 and the load 12. The purpose of this circuit is to insure that the controlled transistor 26 will conduct with a minimum of time delay after the voltage source is applied or after a short circuit or overload condition is corrected.

The temperature characteristics of a transistor are such that an increase in temperature increases the emitter to collector current for a given emitter-to-base bias current with the result that increased reversed bias is required to maintain the transistor at current cut off. Without provision for temperature compensation, the switching point of the protection circuit 8 tends to occur at an increased voltage as the temperature increases. In order to maintain the switching point constant despite temperature variation for any value of load resistance and especially for high resistance loads, it is convenient to employ a Zener diode 36 with a temperature coefficient of resistance of approximately zero and provide temperature compensation for the transistor circuits. This is accomplished by a thermistor 46 having a negative temperature coefficient and connected in series with the resistors 40, 42, and 44. A resistor 38 is connected in parallel with the thermistor 46 and the resistor 40. Alternatively, temperature stabilization may be achieved by employing a Zener diode having a positive temperature characteristic which is the same as the negative temperature characteristic of the transistor circuits and the thermistor 46 and resistors 38 and 40 may be omitted.

Under normal operating conditions, the voltage source 10 is connected with the load 12 through the protection circuit 8. The voltage drop across the thermistor 46, resistor 40, and the top portion of resistor 42 is applied across isolating diode 56, Zener diode 36, and the resistor 34. Normally, this voltage is less than the Zener breakdown voltage and therefore no current flows through resistor 34. Current flow through diode 32 causes a small voltage drop to be applied to the emitter base junction of transistor 28 preventing transistor 28 from conducting. The gain of the transistors 26 and 28 and hence the switching point of the protection circuit 8 remains constant despite temperature and load current variations due to the temperature compensation afforded by the thermistor 46 and the constant voltage drop provided by the diode 32. Adjustment of the switching point is provided by means of the variable resistor 42 connected in series with the Zener diode 36. The transistor 26 is maintained in the region of current saturation so that it is operated at low power dissipation.

If a transient or steady state overvoltage condition occurs, the protection circuit 8 operates to disconnect the load from the source in the following manner. A rise in line voltage increases the voltage drop across the upper portion of voltage dividing network 37. When this voltage drop exceeds the Zener voltage of Zener diode 36 plus the forward voltage of isolating diode 56, the Zener diode 36 conducts. The resulting current flow through resistor 34 develops a voltage drop which decreases the reverse bias of transistor 28 which begins to conduct, and the resulting positive voltage drop across resistor 30 is applied to the base of transistor 26. In addition, the forward voltage drop across diode 48 is applied to the emitter of transistor 26 which ceases to conduct and no current is supplied to the lod. Current flow through the resistor 50 sustains the voltage drop of diode 48. The protection circuit 8 will remain in the open condition as long as the line voltage is equal to or higher than the voltage at which the switching occurred. If the line voltage drops, Zener diode 36 stops conducting and the protection circuit 8 returns to the closed mode of operation. The diode 52 is back biased by the line voltage applied through diode 58 and resistor 60 when the protection circuit 8 is in the open mode of operation and is not a part of the overvoltage control function of the circuit.

Should an overload or short circuit occur in the load, the cathode of diode 52 becomes negative with respect to the anode and the Zener diode 36 develops a voltage thereacross sufficient to cause breakdown thereby enabling transistor 28 and disabling transistor 26 as described above. The only difference is that the curernt, which initiates the switching action and holds the protection circuit 8 in the open mode, flows to ground through resistor 34, Zener diode 36, resistor 54, diode 52, and the short circuit.

The sensing point for the overload function of the protection circuit 8 is between the filter 13 and the transmitting and receiving equipment 14. The impedance at the sensing point is not constant until after the starting interval of the converter. At the instance of starting, the large capacitors of filter 15 are equivalent to a short circuit across the load and consequently transistor 26 is driven to cut off. The large filter capacitors are gradually charged to battery line voltage through resistor 54 and diode 52. As the voltage across the capacitors rises, the charging current through resistor 34 decreases. If the voltage developed across the resistor 34 falls to a level where the protection circuit 8 closes, normal operation will begin. It is possible, however, because of the loose tolerances of the filter capacitors and the large leakage currents which vary with both time and temperature that the voltage across resistor 34 would not decrease sufficiently to turn off transistor 28 and turn on transistor 26 in which case normal operation of the protection circuit would be impossible. The enabling circuit 57 insures against such a possibility by provding a path, independent of the protection circuit 8, for rapidly charging the filter capacitors and thereby back biasing the diode 52. With the diodes 52 back biased, rapid reliable starting is assured. If a real short circuit exists, the back bias will not develop and the overload circuit functions to open transistor 26 and disconnect the load from the battery line.

Since the protection circuit 8 is used for both overvoltage and overload protection and control of the protection circuit 8 through resistor 34 and Zener diode 36 is common to both functions, it is advantageous to provide some means for isolating the two functions. Under a short circuit condition, the isolating diode 56 is back biased to disconnect the voltage divider network from the protection circuit 8 thereby allowing the overload portion of the protection circuit 8 to perform its function independent of the setting of resistor 42. Without the isolating diode 56, the voltage at the movable arm at resistor 42 would establish an operating point for the overload circuit which varies with the overvoltage setting selected for the protection circuit 8. Also, the sensitivity of the protection circuit 8 to overloads would be greatly reduced by the low value of resistance from the movable arm of resistor 42 to the positive supply line.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. A circuit providing both overvoltage and overload protection, said circuit comprising a pair of input terminals for connection to a voltage source and a pair of output terminals for connection to a load, switching means connected between one input terminal and one output terminal, switch operating means including a voltage reference device connected across said input terminals, series means connecting said voltage reference device with said load, said voltage reference device adapted to become conductive upon either a predetermined overvoltage or a predetermined overload to render said switch operating means operative to change the state of said switching means and disconnect said source from said load.

2. A circuit providing both overvoltage and overload protection, said circuit comprising a pair of input terminals for connection to a voltage source and a pair of output terminals for connection to a load, switching means connected between one input terminal and one output terminal, switch operating means including a voltage reference device and a first diode connected in series across said input terminals, series means including a second diode connecting said voltage reference device with said load, said voltage reference device adapted to become conductive upon either a predetermined overvoltage or a predetermined overload to render said switch operating means operative to change the state of said switching means and disconnect said source from said load.

3. A circuit providing both overvoltage and overload protection, said circuit comprising a pair of input terminals for connection to a voltage source and a pair of output terminals for connection to a load, said load including capacitive elements, switching means connected between one input terminal and one output terminal, switch operating means including a voltage reference device and a first diode connected in series across said input terminals, a resistor and a second diode connecting said voltage reference device in series with said load, said voltage reference device becoming conductive upon either a predetermined overvoltage or a predetermined overload whereby said switch operating means is enabled and said switching means is disabled and said load is disconnected from a said source, and a resistor and a third diode connected in series between said source and said load for providing a path independent of said protection circuit for charging said capacitive elements when said protection circuit is initially connected to said source and said load.

4. A circuit providing both overvoltage and overload protection and having a pair of input terminals for connection to a voltage source and a pair of output terminals for connection to a load, a controlled transistor having its output circuit connected between one input terminal and one output terminal and its input circuit connected across the input terminals so that the controlled transistor is normally forwardly biased when a voltage is applied across the input terminals, a voltage reference element and an impedance element connected across said input terminals, series means connecting said voltage reference element with said load, a normally reversely biased control transistor having an output circuit connected across the input circuit of the controlled transistor and an input circuit connected across one of said elements, said voltage reference device being adapted to become conductive upon either a predetermined overvoltage or a predetermined overload whereby the control transistor is forwardly biased and the controlled transistor is reversely biased to disconnect the voltage source from the load.

5. A circuit providing both overvoltage and overload protection and having a pair of input terminals for connection to a voltage source and a pair of output terminals for connection to a load, a controlled transistor having its output circuit connected between one input terminal and one output terminal and its input circuit connected across the input terminals so that the controlled transistor is normally forwardly biased when a voltage is applied across the input terminals, a voltage reference element and an impedance element connected across said input terminals, a resistor and a diode connecting said voltage reference element in series with said load, a normally reversely biased control transistor having an output circuit connected across the input circuit of the controlled transistor and an input circuit connected across one of said elements, said voltage reference device being adapted to become conductive upon either a predetermined overvoltage or a predetermined overload whereby the control transistor is forwardly biased and the controlled transistor is reversely biased to disconnect the voltage source from the load.

6. A circuit providing both overvoltage and overload protection and having a pair of input terminals for connection with a voltage source and a pair of output terminals for connection with a load, a controlled transistor having its output circuit connected between one input terminal and one output terminal and its input circuit connected across the input terminals so that the controlled transistor is normally forwardly biased when voltage is applied across the input terminals, a first diode connected in said output circuit between said one input terminal and the controlled transistor, a bias resistor, a Zener diode and an isolating diode connected in series across the input terminals, a resistor and a fourth diode connecting said Zener diode in series with said load, a control transistor having an output circuit connected across the input circuit of the controlled transistor and an input circuit connected across said bias resistor and the first diode to normally reversely bias the control transistor, said Zener diode being adapted to become conductive at a predetermined overvoltage or a predetermined overload whereby the control transistor becomes conductive and the controlled transistor is reversely biased to disconnect the voltage source from the load.

7. A circuit providing both overvoltage and overload protection and having a pair of input terminals for connection with the voltage source and a pair of output terminals for connection with a load, said load including capacitive elements, a controlled transistor having its output circuit connected between one input terminal and one output terminal and its input circuit connected across the input terminals so that the controlled transistor is normally forwardly biased when voltage is applied across the input terminals, a first diode connected in said output circuit between said one input terminal and the controlled transistor; a bias resistor, a Zener diode, an isolating diode and a voltage dividing resistor connected in series across said input terminals, a resistor and a fourth diode connected between said load and the junction between said Zener diode and said isolating diode, a control transistor having an output circuit connected across the input circuit of the controlled transistor and an input circuit connected across said bias resistor and said first diode to normally reversely bias the control transistor, said Zener diode being adapted to become conductive upon either a predetermined overvoltage or a predetermined overload whereby the control transistor becomes conductive and the controlled transistor is reversely biased to disconnect the voltage source from the load, and a resistor and a fifth diode connected between said one input terminal and said load for providing a path independent of said protection circuit for charging said capacitive elements when said protection circuit is initially connected with said source and said load.

References Cited by the Examiner

UNITED STATES PATENTS

| | | | |
|---|---|---|---|
| 3,048,718 | 8/1962 | Starzec et al. | 317—20 X |
| 3,078,410 | 2/1963 | Thomas. | |
| 3,098,192 | 7/1963 | Levy. | |
| 3,101,441 | 8/1963 | Curry. | |
| 3,125,715 | 3/1964 | Brooks. | |
| 3,131,344 | 4/1964 | Rosenfeld et al. | |
| 3,192,441 | 6/1965 | Wright | 317—33 |
| 3,204,175 | 8/1965 | Viuriger | 317—33 X |

OTHER REFERENCES

"Ideas for Design," Electronic Design magazine, May 27, 1959, pp. 46–47.

MILTON O. HIRSHFIELD, *Primary Examiner.*

MAX L. LEVY, *Examiner.*

R. V. LUPO, *Assistant Examiner.*